(12) United States Patent
Niwa

(10) Patent No.: US 6,997,096 B2
(45) Date of Patent: *Feb. 14, 2006

(54) BINDING CORD FOR MOTOR FOR ELECTRIC VEHICLE

(75) Inventor: Shu Niwa, Osaka (JP)

(73) Assignee: Gosen Co., Ltd., Osaka (JP)

( * ) Notice: Subject to any disclaimer, the term of this patent is extended or adjusted under 35 U.S.C. 154(b) by 19 days.

This patent is subject to a terminal disclaimer.

(21) Appl. No.: 10/704,099

(22) Filed: Nov. 7, 2003

(65) Prior Publication Data

US 2004/0094023 A1    May 20, 2004

(30) Foreign Application Priority Data

Nov. 12, 2002   (JP)   .............................. 2002-328313

(51) Int. Cl.
*D04C 1/12*   (2006.01)

(52) U.S. Cl. ............................................. 87/9

(58) Field of Classification Search ................. 87/9–13
See application file for complete search history.

(56) References Cited

U.S. PATENT DOCUMENTS

| | | | | |
|---|---|---|---|---|
| 4,502,364 | A * | 3/1985 | Zucker et al. | 87/8 |
| 5,197,370 | A | 3/1993 | Gladfelter | |
| 5,242,743 | A * | 9/1993 | Nakanishi et al. | 428/222 |
| 5,876,297 | A * | 3/1999 | Takeuchi | 474/202 |
| 6,341,550 | B1 * | 1/2002 | White | 87/5 |
| 2004/0091655 | A1 * | 5/2004 | Niwa | 428/36.3 |

FOREIGN PATENT DOCUMENTS

| | | |
|---|---|---|
| JP | 6-73649 | 3/1994 |
| JP | 6-335632 | 12/1994 |
| JP | 08-13300 | 1/1996 |
| JP | 10-273825 | 10/1998 |
| JP | 11-093028 | 4/1999 |
| JP | 11-279880 | 10/1999 |
| JP | 2001-123324 | 5/2001 |
| JP | 2001-248075 | 9/2001 |

* cited by examiner

*Primary Examiner*—John J. Calvert
*Assistant Examiner*—Shaun R. Hurley
(74) *Attorney, Agent, or Firm*—Hamre, Schumann, Mueller, & Larons, P.C.

(57) ABSTRACT

A binding cord for a motor for an electric vehicle includes a braided round cord of eight or more strands using a multifilament strand made of synthetic fibers having a melting point or a decomposition temperature at 280° C. or more. The binding cord has oil resistance at high temperatures of 50% or more, the oil resistance at high temperatures being represented by the following formula: oil resistance at high temperatures (%)=(T′/T)×100. Here, T denotes a tensile strength of the binding cord before treatment and T′ denotes a tensile strength of the binding cord after the treatment. The tensile strength is measured in accordance with JIS L1013-8.5.1, and the treatment is carried out in such a manner that the entire binding cord is put into a closed container containing a mixture of 5 weight % of water and 95 weight % of automatic transmission fluid, followed by heating the container so that a temperature of the mixture is maintained at 150° C. for 1,000 hours.

13 Claims, 1 Drawing Sheet

BINDING CORD FOR MOTOR FOR ELECTRIC VEHICLE

BACKGROUND OF THE INVENTION

1. Field of the Invention

The present invention relates to a binding cord for a motor for an electric vehicle (hereinafter also referred to as a binding cord for an electric vehicle motor).

2. Related Background Art

Conventionally, it has been demanded to combine a decrease in 10 hazardous substances contained in the exhaust gas emitted from vehiclesand an increase in gas mileage. In recent years, there has been a further request for addressing global euvironmental issues. Against this background, research and development of electric vehicles have been carried out vigorously. Electric vehicles currently being developed include: a pure electric vehicle (PEV) equipped with a high-capacitance secondary battery; a hybrid electric vehicle (11EV) in which a gasoline engine and a high power secondary battery are combined; a fuel-cell hybrid electric vehicle (FCHEV) in which a fuel cell and a high power secondary battery are combined and the like. In any ease, a high-efficiency motor has to be developed. As such a motor, there are motors for driving and for generating and charging electric power. It has been strongly demanded to stabilize the qualities of these motors in terms of the traveling stability, in addition to the high efficiency. Especially in the case of an electric vehicle motor, it is required to have excellent oil resistance at high temperatures as compared with a motor for normal vehicles. In order to enhance the efficiency, an electric vehicle motor has to be exposed to ATF (automatic transmission fluid). Since the ATF reaches a high temperature in some cases, the motor is required to have resistance to high temperatures in the ATF. In addition to that, there has been a demand for the development of a material used for a component of the motor so as to have homogenous performance.

Conventionally, the use of a multifilament strand made of polyphenylene sulfide (PPS) fibers as an electrical insulating material has been proposed (See JP H08(1996)-13300 A, JP H10(1998)-273825 A and JP 2001-248075 A).

SUMMARY OF THE INVENTION

However, a binding cord made of such a conventional electrical insulating material has the following drawbacks: when the binding cord is used for binding a motor component such as a coil, there is a tendency to scratch the component because the binding cord has a poor lubricity in a binding state. Furthermore, such a binding cord has poor heat resistance in the ATF. In addition, since such a binding cord has a high bending resistance, which means that such a cord is too stiff for binding, a tightening capability is not sufficient. As another proposal, conventionally, an 8-strand braided square cord made of polyethylene terephthalate (PET) has been used for a binding cord. However, the binding cord made of PET has a problem with oil resistance at high temperatures, has high bending resistance, and is so stiff for binding that it cannot provide a sufficient tightening capability.

Therefore, with the foregoing in mind, it is an object of the present invention to provide a binding cord for an electric vehicle motor with a reduced tendency to scratch a bound motor component, with high tightening capability for binding and with high oil resistance at high temperatures.

In order to fulfill the above-stated object, a binding cord for an electric vehicle motor of the present invention includes a braided round cord of eight or more strands using a multifilament strand made of synthetic fibers having a melting point or a decomposition temperature at 280° C. or more. The binding cord has oil resistance at high temperatures of 50% or more. Here, the oil resistance at high temperatures is represented by the following formula:

oil resistance at high temperatures (%)=(T'/T)×100 where T denotes a tensile strength of the binding cord before treatment and T' denotes a tensile strength of the binding cord after the treatment.

Here, the tensile strength is measured in accordance with JIS L1013-8.5.1, and the treatment is carried out in such a manner that the entire binding cord is put into a closed container containing a mixture of 5 weight % of water and 95 weight % of automatic transmission fluid, followed by heating the container so that a temperature of the mixture is maintained at 150° C. for 1,000 hours.

The oil resistance at high temperatures relates to the comparison of tensile strength between before and after the high temperature treatment in oil. A value closer to 100% of this means that the tensile strength of the binding cord for an electric vehicle motor does not change even after the high temperature treatment, that is, the binding cord for an electric vehicle motor has excellent oil resistance at high temperatures.

In addition, since the high temperature treatment is carried out in a mixture of automatic transmission fluid and water, the above-stated high oil resistance at high temperatures means that the binding cord has resistance against hydrolytic degradation as well.

DETAILED DESCRIPTION OF THE INVENTION

A binding cord for an electric vehicle motor of the present invention has a reduced tendency to scratch a bound motor component, has high tightening capability for binding and has high oil resistance at high temperatures.

Motor components for the binding cord for an electric vehicle motor of the present invention refer to components making up the motor for an electric vehicle, including a coil, a wire and a sleeve, for example. The binding cord for a motor for an electric vehicle of the present invention is a braided binding cord that can be used for manufacturing the motor for an electric vehicle so as to bind such motor components.

Figure 2:
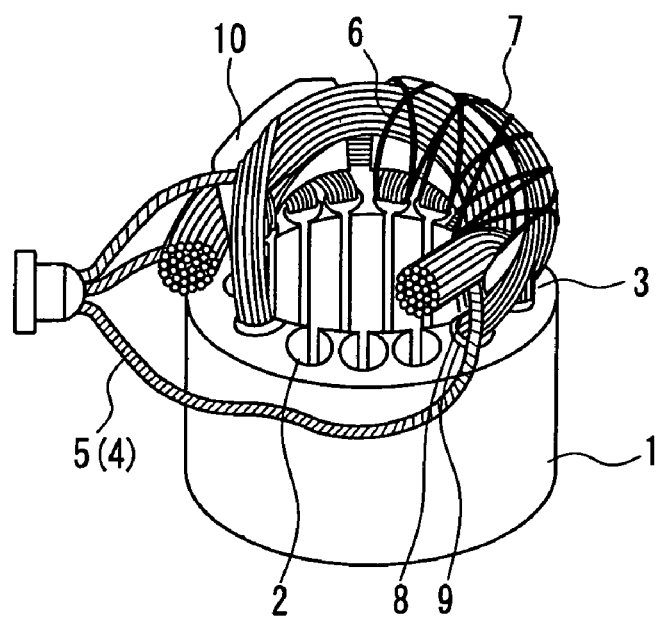
FIG. 2 is a diagrammatic perspective view showing an application example of a binding cord for an electric vehicle motor of the present invention.

The binding cord for an electric vehicle motor of the present invention can be used for binding a coil in a stator of a motor, for example, as shown in FIG. 2. In FIG. 2, the stator of the motor may be a stator of a three-phase motor, for example, and includes: a stator core 1; coils 3 for the respective phases that are housed in a plurality of slots 2 formed on an inner side of the stator core 1; wires 4 for connecting the coils 3 for the respective phases to an external power supply terminal; and an insulation tube 5 for wire that surrounds each of the wires 4. Note here that, in FIG. 2, reference numeral 6 denotes a binding cord for binding the coils 3, 7 denotes an insulation tube for thermostat, 8 denotes a slot liner, 9 denotes a wedge and 10 denotes an interphase paper.

The melting point or the decomposition temperature of the synthetic fibers of the multifilament strand is not less than 280° C., and preferably not less than 283° C.

The braided cord includes eight or more strands, and preferably includes eight to thirty-two strands, inclusive. The braided cord of eight to thirty-two strands, inclusive, can provide a sufficient strength and high durability. The braided cord preferably includes twelve, sixteen, twenty or twenty-four strands, which is not too thick and can provide good workability. The braided cord of the present invention is flexible because it is braided using fibers that can move easily so that a center portion of the cord is hollow. Therefore, the binding cord has excellent lubricity, thus having a reduced tendency to scratch a bound motor component.

The oil resistance at high temperatures of the binding cord is described above as 50% or more, and 55% or more is preferable, which can provide a motor for an electric vehicle capable of traveling stably for a long time.

The above-described synthetic fibers for the multifilament strand having the melting point or the thermal decomposition temperature of 280° C. or more preferably are a polyphenylene sulfide fiber or an aramid fiber. These fibers can realize high oil resistance at high temperatures of the binding cord. The synthetic fibers having the melting point or the thermal decomposition temperature of 283° C. or more include a polyphenylene sulfide fiber or an aramid fiber. The aramid fiber includes para-aramid fibers and meta-aramid fibers, and the latter meta-aramid fibers are preferable.

Bending resistance of the binding cord measured in accordance with JIS L 1096 A (45° cantilever method) preferably is 75 or less. The bending resistance of 75 or less can allow a binding operation to be conducted smoothly and can provide excellent tightening capability by the binding cord. The bending resistance more preferably is 73 or less.

A thickness of the multifilament strand preferably ranges from 150 dtex to 600 dtex, inclusive. This range can provide high degree of flexibility of the cord and can improve the workability. The thickness of the multifilament strand more preferably ranges from 200 dtex to 500 dtex, inclusive, and further preferably ranges from 200 dtex to 400 dtex, inclusive.

A thickness of the binding cord (measured in accordance with JIS L1013-8.3.1 (A)) preferably ranges from 3,200 dtex to 9,600 dtex, inclusive. This range can maintain the bending resistance of the binding cord so as to carry out the binding operation smoothly. The thickness of the binding cord more preferably ranges from 4,800 dtex to 8,000 dtex, inclusive.

A shape of the binding cord preferably is in a tube form and in an oblate form, which can allow the binding operation to be conducted firmly.

A weight of the binding cord per meter preferably ranges from 0.5 g to 1.5 g, inclusive, which can realize a sufficient strength and high durability. The weight of the binding cord per meter more preferably ranges from 0.8 g to 1.2 g, inclusive, which can provide good workability and a reduced cost.

A tensile strength of the binding cord (measured in accordance with JIS L1013-8.5.1) preferably ranges from 150 N to 350 N, inclusive, and more preferably ranges from 200 N to 300 N, inclusive.

Elongation percentage of the binding cord (measured in accordance with JIS L1013-8.5.1) preferably ranges from 15% to 40%, inclusive. With this configuration, the binding cord can realize high tightening capability and when it is used for a vehicle, especially for a motor for an electric vehicle, the vehicle can travel stably. The elongation percentage of the binding cord more preferably ranges from 20% to 30%, inclusive.

For example, a braided round cord for a motor for an electric vehicle that includes eight to thirty-two strands, inclusive, using a multifilament strand made of a polyphenylene sulfide fiber or an aramid fiber of 150 dtex to 600 dtex, inclusive is preferable.

EXAMPLES

The following further describes the present invention in detail, with reference to the not-limiting examples and comparative examples. In the following examples and comparative examples, melting points or decomposition temperatures and oil resistance at high temperatures of a binding cord for an electric vehicle motor were measured as follows:

(1) Melting point or decomposition temperature: a specimen was heated together with a reference substance by a DSC (differential scanning calorimetry) method at an increasing rate of 10° C./min, whereby a temperature of melting or decomposition was measured.

(2) Oil resistance at high temperatures: the entire binding cord with a length of 60 cm was put into a closed container containing a mixture (5 liter) of 5 weight % of water and 95 weight % of automatic transmission fluid (ATF WS (trade name) made by Esso Sekiyu K.K.). Then, the container was heated so as to maintain the temperature of the mixture in the container at 150° C. for 1,000 hours. A tensile strength (T) of the binding cord before such treatment and a tensile strength (T') of the binding cord after the treatment were measured in conformance with JIS L1013-8.5.1. The thus obtained tensile strengths were introduced into the following formula so as to determine the oil resistance at high temperatures. An average of the values obtained by the measurement conducted five times was calculated. Note here that in this measurement any ATF can be used as the ATF.

Oil resistance at high temperatures (%)=(T'/T)×100 where T denotes a tensile strength before the treatment and T' denotes a tensile strength after the treatment.

(3) Bending resistance: bending resistance was determined in conformance with JIS L 1096A (45° cantilever method). More specifically, a binding cord for an electric vehicle motor (a length of about 15 cm) was placed on a horizontal stage with a smooth surface having a slanting face of 45° at one end so that one end of the cord was on a base line of a scale. Thereafter, the binding cord was allowed to gently slide in a direction of the slanting face, and when one end of the binding cord contacted with the slanting face, a position of the other end was measured by the scale. Bending resistance was indicated by the sliding length (mm) of the binding cord, and an average of the values obtained by the measurement conducted five times was calculated and rounded to an integer.

(4) Thickness of a binding cord for an electric vehicle motor: the thickness was determined as a fineness based on corrected mass in conformance with JIS L 1013-8.3.1 (A). More specifically, a binding cord for an electric vehicle motor was wound up on a wrap reel having a circumference of 1.125 meters at a rate of 120 windings/min while applying a predetermined load of 213 gf (2.0888 N) thereto, whereby a skein with a predetermined string length of 90 m was formed. The mass of the skein was measured so as to determine an apparent fineness. Using an equilibrium moisture regain that has been measured separately, the fineness based on corrected mass (D) was calculated. The test was conducted five times, and an average of them was used (calculated to one decimal place).

$$F=D\times[(100+Ro)/(100+Rs)]$$

where F denotes a fineness based on corrected mass (in tex), D denotes an apparent fineness (in tex), Ro denotes an official moisture regain defined by JIS L 0105 3.1 (official moisture regain) (in %), and Rs denotes an equilibrium moisture regain (n %).

(5) Tensile strength and elongation percentage of a binding cord for an electric vehicle motor: they were determined in conformance with JIS L 1013-8.5.1. More specifically, a test was conducted so that a binding cord for an electric vehicle motor was attached to grabs of a tensile strength tester (type of the tester: constant-speed elongation type, interval between the grabs: 25 cm, and elongation rate: 30 cm/min). The elongation when an initial load was applied was rendered as looseness (mm). When the specimen was further elongated until the specimen was cut off, the elongation (mm) and the load (N) applied at the timing of the cut-off were measured, and the tensile strength (N/tex) and the elongation percentage (%) were calculated using the following formulas. The test was conducted 10 times and an average of them was used (calculated to two places of decimals for the tensile strength and one place for the elongation percentage).

$$T=SD/F$$

where T denotes a tensile strength (in N/tex), SD denotes a strength at the time of the cut-off (in N), F denotes a fineness based on corrected mass (in tex), and $$S=[(E_2-E_1)/(L+E_1)]\times 100$$

where S denotes elongation percentage (in %), $E_1$ denotes looseness (in mm), $E_2$ denotes elongation at the time of the cut-off (in mm) or elongation under the maximum load (in mm), and L denotes an interval between grabs (in mm).

Example 1

A multifilament strand (440 dtex, 100 filaments, 190 types) made of PPS fibers (made by Toray Industries, Inc., "Torcon" (trade name), melting point or decomposition temperature=285° C.) was wound on sixteen small bobbins.

Figure 1:
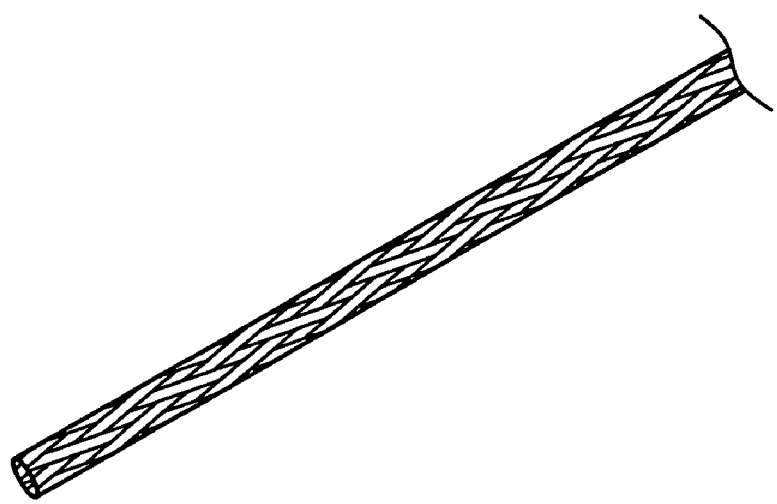
FIG. 1 is a plan view showing the appearance of a binding cord for an electric vehicle motor that is obtained in Example 1 of the present invention.

These bobbins were mounted on a 16-strand braider for round cord so as to form a braided cord, whereby a binding cord for an electric vehicle motor was obtained. The binding cord had a tube form, but the appearance of the same was crushed in an oblate form with a major axis of 1.85 mm and a minor axis of 0.52 mm. Oil resistance at high temperatures of this binding cord was 73.5%. This binding cord had bending resistance of 70 and a thickness of 7,040 dtex. Tensile strength and elongation percentage of this binding cord were 324 N and 25.9%, respectively. The appearance of the obtained binding cord is shown in FIG. 1.

When this binding cord was incorporated into an electric vehicle motor, braiding of the bound coil was favorable with excellent slipperiness, as compared with comparative examples 1 and 2. As a result, a variation in tension at a binding state by the binding cord became extremely low, and it was confirmed that the stability of the binding capability of the binding cord was excellent. In addition, no scratch of the coil by the binding was found. Furthermore, since the binding cord was wound so as to overlap in an oblate form, the tightening capability and the binding state were excellent.

Example 2

Two multifilament strands (220 dtex, 100 filaments, 430 types) made of meta-aramid fibers (made by Dupont, "Nomex" (trade name), melting point or decomposition temperature=371° C.) were pulled parallel and wound on sixteen small bobbins.

These bobbins were mounted on a 16-strand braider for round cord so as to form a braided cord, whereby a binding cord for an electric vehicle motor was obtained. The binding cord had a tube form, but the appearance of the same was crushed in an oblate form.

When this binding cord was incorporated into an electric vehicle motor in the same manner as in Example 1, this binding cord was slightly stiffer than Example 1 and was slightly inferior in the braiding capability. However, slipperiness was better than comparative examples 1 and 2, and therefore a variation in tension at a binding state by the binding cord became extremely low, and it was confirmed that the stability of the binding capability of the binding cord was excellent. In addition, no scratch of the coil by the binding was found. Furthermore, since the binding cord was wound so as to overlap in an oblate form, the tightening capability and the binding state were excellent. Oil resistance at high temperatures of this binding cord was 91.2%. This binding cord had bending resistance of 72 and a thickness of 7,040 dtex. Tensile strength and elongation percentage of this binding cord were 330 N and 27.7%, respectively.

Example 3

A binding cord for an electric vehicle motor was obtained in the same manner as in Example 1, except that the bobbins were mounted on a 12-strand braider for round cord. The binding cord had a tube form, but the appearance of the same was crushed in an oblate form with a major axis of 1.80 mm and a minor axis of 0.49 mm. Oil resistance at high temperatures of this binding cord was 73.5%. This binding cord had bending resistance of 69 and a thickness of 5,280 dtex. Tensile strength and elongation percentage of this binding cord were 243 N and 26.4%, respectively.

When this binding cord was incorporated into an electric vehicle motor, braiding of the bound coil was favorable with excellent slipperiness, as compared with comparative examples 1 and 2. As a result, a variation in tension at a binding state by the binding cord became extremely low, and it was confirmed that the stability of the binding capability of the binding cord was excellent. In addition, no scratch of the coil by the binding was found. Furthermore, since the binding cord was wound so as to overlap in an oblate form, the tightening capability and the binding state were excellent.

Comparative Example 1

Two multifilament strands made of the same PPS fibers as in Example 1 were pulled parallel and were wound on eight small bobbins. These bobbins were mounted on an 8-strand braider for square cord so as to form a braided cord, whereby a binding cord for an electric vehicle motor was obtained. The binding cord had a cross-section in a quadrilateral form and had slightly stiff texture.

When this binding cord was incorporated into an electric vehicle motor in the same manner as in Example 1, the binding workability was inferior to Examples 1 and 2 because of the stiffness. Oil resistance at high temperatures of this binding cord was 70.5%. This binding cord had bending resistance of 81 and a thickness of 7,040 dtex. Tensile strength and elongation percentage of this binding cord were 296 N and 37.3%, respectively.

Comparative Example 2

Two multifilament strands (550 dtex, 96 filaments, 702 types) made of polyethylene terephthalate fibers (made by Toray Industries, Inc., "Tetoron" (trade name), melting point or decomposition temperature=260° C.) were pulled parallel and were wound on eight small bobbins.

These bobbins were mounted on an 8-strand braider for square cord so as to form a braided cord, whereby a binding cord for an electric vehicle motor was obtained. The binding cord was slightly stiff and had an appearance in a quadrilateral form. Oil resistance of this binding cord at high temperatures was so bad that it could not be measured. This binding cord had bending resistance of 93 and a thickness of 8,800 dtex. Tensile strength and elongation percentage of this binding cord were 407 N and 23.8%, respectively. When this binding cord was incorporated into an electric vehicle motor in the same manner as in Example 1, the binding workability was inferior to Examples 1 and 2 because of the stiffness.

The invention may be embodied in other forms without departing from the spirit or essential characteristics thereof. The embodiments disclosed in this application are to be considered in all respects as illustrative and not limiting. The scope of the invention is indicated by the appended claims rather than by the foregoing description, and all changes which come within the meaning and range of equivalency of the claims are intended to be embraced therein.

What is claimed is:

1. A binding cord for a motor for an electric vehicle comprising a braided round cord of eight or more strands using a multifilament strand made of synthetic fibers having a melting point or a decomposition temperature at 280° C. or more, wherein the binding cord has oil resistance at high temperatures of 50% or more, the oil resistance at high temperatures being represented by the following formula:

oil resistance at high temperatures $(\%)=(T'/T)\times 100$ where T denotes a tensile strength of the binding cord before treatment and T' denotes a tensile strength of the binding cord after the treatment, wherein the tensile strength is measured in accordance with JIS L1013-8.5.1, and the treatment is carried out in such a manner that the entire binding cord is put into a closed container containing a mixture of 5 weight % of water and 95 weight % of automatic transmission fluid, followed by heating the container so that a temperature of the mixture is maintained at 150° C. for 1,000 hours, and wherein a shape of the binding cord is in a tube form and in an oblate form.

2. The binding cord for a motor for an electric vehicle according to claim 1, wherein the synthetic fibers having a melting point or a decomposition temperature at 280° C. or more are a polyphenylene sulfide fiber or an aramid fiber.

3. The binding card for a motor for an electric vehicle according to claim 1, wherein bending resistance of the binding cord measured in accordance with JTIS L 1096 A (45° cantilever method) is 75 or less.

4. The binding cord for a motor for an electric vehicle according to claim 1, wherein a thickness of the naultifilament strand ranges from 150 dtex to 600 dtex, inclusive.

5. The binding cord for a motor for an electric vehicle according to claim 1, wherein a thickness of the binding cord ranges from 3,200 dtex to 9,600 dtex, inclusive.

6. The binding cord for a motor for an electric vehicle according to claim 1, wherein a weight of the binding cord per meter ranges from 0.5 g to 1.5 g, inclusive.

7. The binding cord for a motor for an electric vehicle according to claim 1, wherein a tensile strength of the binding cord measured in accordance with JIS L1013-8.5.1 ranges from 150 N to 350 N, inclusive.

8. The binding cord for a motor for an electric vehicle according to claim 1, wherein elongation percentage of the binding cord measured in accordance with JIS L1013-8.5.1 ranges from 15% to 40%, inclusive.

9. A binding cord for a motor for an electric vehicle, comprising a braided round cord of eight to thirty-two strands, inclusive, using a multifilament strand made of a polyphenylene sulfide fiber or an aramid fiber of 150 dtex to 600 dtex, inclusive, wherein a shape of the binding cord is in a tube form and in an oblate form.

10. An electric vehicle motor component for a motor for an electric vehicle, comprising the binding cord of claim 1 that binds the component in the electric vehicle.

11. A coil for a motor for an electric vehicle, comprising the binding cord of claim 1 that binds the coil in the electric vehicle.

12. A wire for a motor for an electric vehicle, comprising the binding cord of claim 1 that binds the wire in the electric vehicle.

13. A sleeve for a motor for an electric vehicle, comprising the binding cord of claim 1 that binds the sleeve in the electric vehicle.

* * * * *